US012363627B2

(12) United States Patent
Saxena et al.

(10) Patent No.: US 12,363,627 B2
(45) Date of Patent: Jul. 15, 2025

(54) PROVISIONING EDGE RESOURCES BASED ON CHANGES IN BUSINESS DENSITY LOCATION

(71) Applicant: International Business Machines Corporation, Armonk, NY (US)

(72) Inventors: Rajesh Kumar Saxena, Thane East (IN); Harish Bharti, Pune (IN); Deepak Bajaj, Jaipur (IN); Sandeep Sukhija, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 17/823,108

(22) Filed: Aug. 30, 2022

(65) Prior Publication Data

US 2024/0073799 A1 Feb. 29, 2024

(51) Int. Cl.
*H04W 48/18* (2009.01)
*H04W 4/02* (2018.01)
*H04W 72/04* (2023.01)
*H04W 84/18* (2009.01)

(52) U.S. Cl.
CPC ........... *H04W 48/18* (2013.01); *H04W 4/023* (2013.01); *H04W 72/04* (2013.01); *H04W 84/18* (2013.01)

(58) Field of Classification Search
CPC ..... H04W 28/02; H04W 4/023; H04W 48/18; H04W 72/04; H04W 84/18
See application file for complete search history.

(56) References Cited

U.S. PATENT DOCUMENTS

| 7,640,328 | B1 * | 12/2009 | Lele | G06F 11/1658 714/10 |
| 10,866,836 | B1 | 12/2020 | Guo | |
| 11,201,794 | B1 | 12/2021 | Guo | |
| 2005/0010591 | A1 * | 1/2005 | Beaulieu | G06F 16/2428 707/999.102 |
| 2017/0237609 | A1 * | 8/2017 | Yin | H04L 67/1095 709/222 |
| 2020/0142789 | A1 * | 5/2020 | Ali | H04L 41/0668 |
| 2020/0201687 | A1 * | 6/2020 | Wu | G06F 9/542 |
| 2021/0144517 | A1 | 5/2021 | Guim Bernat | |
| 2021/0235334 | A1 * | 7/2021 | Purkayastha | H04W 36/00222 |
| 2022/0294792 | A1 * | 9/2022 | Patel | H04L 63/0861 |

(Continued)

OTHER PUBLICATIONS

Alsurdeh et al., "Hybrid Workflow Scheduling on Edge Cloud Computing Systems", IEEE Access, Digital Object Identifier 10.1109/ACCESS.2021.3116716, date of publication Sep. 29, 2021, date of current version Oct. 7, 2021, 17 pages.

(Continued)

*Primary Examiner* — Sai Aung
(74) *Attorney, Agent, or Firm* — Stephen R. Yoder

(57) ABSTRACT

Setting a primary server within a business density cluster when the business density location changes. A new primary edge provisioning server replaces a current primary edge provisioning server when the business density cluster is determined not to include the current primary edge provisioning server. An edge provisioning framework handles the associations and dissociations of the edge network(s) to build the new primary server within the business density cluster. The former primary server is respawned as a new secondary node to the new primary server.

18 Claims, 6 Drawing Sheets

(56) References Cited

U.S. PATENT DOCUMENTS

2023/0394971 A1* 12/2023 Kobayashi ............ G08G 1/0133
2024/0007944 A1*  1/2024 Faxén ................... H04L 1/1822
2024/0121683 A1*  4/2024 G?Rsu ............ H04W 36/00835

OTHER PUBLICATIONS

"IBM Cloud Pak for Network Automation", retrieved from web https://www.ibm.com/docs/en/cloud-paks/1.0?topic=architecture-cloud-pak-network-automation, Nov. 10, 2022, 2 pages.

* cited by examiner

PROVISIONING EDGE RESOURCES BASED ON CHANGES IN BUSINESS DENSITY LOCATION

BACKGROUND

The present invention relates generally to the field of edge networks, and more particularly to provisioning edge servers.

Ultra-low latency applications require fast data processing and have low tolerance for delay. Applications categorized as ultra-low latency include, for example, autonomous vehicles and remote surgery. Cloud computing does not often satisfy the requirements of the ultra-low latency applications because of high latency between user equipment and the cloud infrastructure. Currently, if a user requires a service that is outside the capability of or working scope of the available cloud network then it is not feasible to be performed. Even if performed by the available cloud network, the central cloud servers (or hybrid servers) are introduced in a way that does not align with the inherent edge computing benefits that are driving the end consumer request/requirement. Processing such requests can be impeded by performing the tasks within a cloud network.

An edge node is a computer that acts as an end user portal for communication with other nodes in cluster computing. Edge nodes are also sometimes called gateway nodes or edge communication nodes. In a Hadoop cluster, three types of nodes exist: master, worker, and edge nodes. An edge node device provides the intelligence to sense, measure, interpret, and connect to an internet gateway to the cloud. Edge nodes can include micro servers, IoT gateways, routers, and mobile devices. They are connected to the wide area network (WAN) and provide low-latency service to users that are within a suitable communication distance. An edge server is a type of edge device, or node, that provides an entry point into a network. Other edges devices include routers and routing switches. Edge devices are often placed inside internet exchange points (IxPs) to allow different networks to connect and share transit.

Network slicing is a method of creating multiple unique logical and virtualized networks over a common multi-domain infrastructure. 5G network slicing is a network architecture that enables the multiplexing of virtualized and independent logical networks on the same physical network infrastructure. Each network slice is an isolated end-to-end network tailored to fulfil diverse requirements requested by a particular application. The applications that are enabled or enhanced by a 5G network need greater bandwidth, more connections, and lower latency than was achievable with previous generations.

For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

SUMMARY

In one aspect of the present invention, a method, a computer program product, and a system includes: determining a set of candidate secondary nodes located within a geo-spatial boundary of an identified business density cluster in an edge network; collecting nodal constraints for a primary node-provisioning server in the geo-spatial boundary; and transferring a role of primary node-provisioning server to a selected secondary node of the set of candidate secondary nodes to establish a new primary node-provisioning server.

In another aspect of the present invention, a method, a computer program product, and a system includes: analyzing the nodal constraints including a validated activation code index; transmitting bandwidth and migration time for network slice invocation; solving a corresponding crypto object to invoke the network slice; and receiving, from a third-party fifth-generation (5G) provider, virtualized network slice invocation codes for manifesting the new primary node-provisioning server.

DETAILED DESCRIPTION

Figure 1:
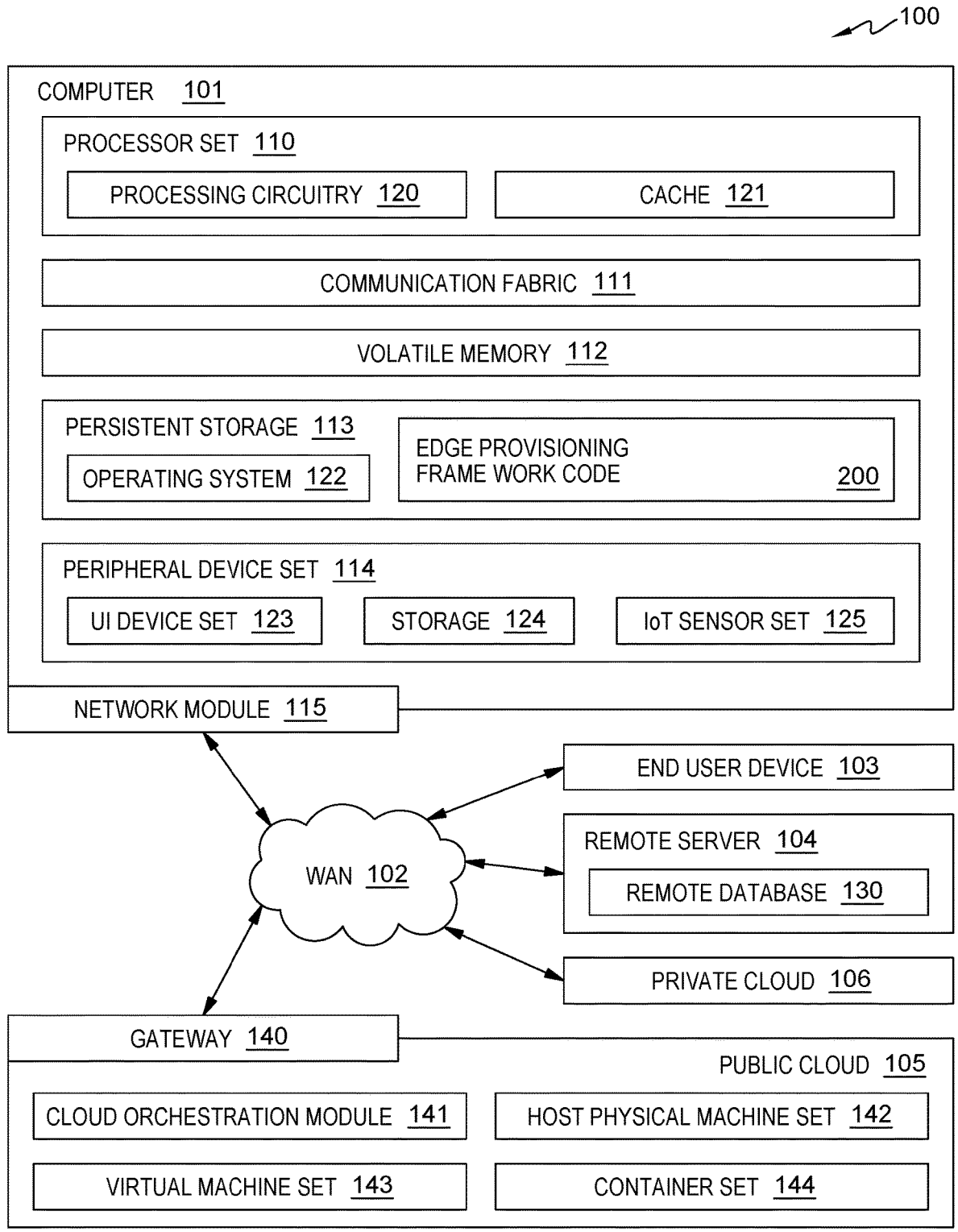
FIG. 1 is a schematic view of a first embodiment of a system according to the present invention.

Setting a primary server within a business density cluster when the business density location changes. A new primary edge provisioning server replaces a current primary edge provisioning server when the business density cluster is determined not to include the current primary edge provisioning server. An edge provisioning framework handles the associations and dissociations of the edge network(s) to build the new primary server within the business density cluster. The former primary server is respawned as a new secondary node to the new primary server. The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as edge provisioning framework code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Edge provisioning framework code 200 operates to determine a business density cluster shift of an edge computing network in a computing environment, such as computing environment 100 (FIG. 1) and, when the business density cluster no longer includes the current primary node-provisioning server, set up a new primary from a second node within the business density cluster. The edge provisioning framework further operates to update secondary nodes to associate with the new primary server and respawn the former primary server as a new edge node to the new primary node-provisioning server.

Some embodiments of the present invention recognize the following facts, potential problems and/or potential areas for improvement with respect to the current state of the art: (i) for ultra-low latency applications, edge computing technology offers solutions to the drawbacks of cloud technology; (ii) instead of having the cloud perform computing tasks for an ultra-low-latency application, the tasks can be performed at the edge of the network; (iii) the computing tasks are performed in devices/applications at the location where real-time data processing provides services according to quality of service requirements; (iv) depending on business requirements or use cases, the business density cluster may change frequently; and (v) a business may involve many new customer interactions such as when handling cab bookings or food delivery requests from more than one geo-spatial location.

When referring to a download or program, binaries are compiled code that allow a program to be installed without having to compile the source code. Many open-source programs offer downloads in source format. This format allows users to view the code, but also requires the code to be compiled or in binaries format.

Some embodiments of the present invention are directed to changes to the scope of hybrid edge service provisioning. Based on the business function requirement of ultra-low latency, the spawning location of the edge cloud function may be assigned according to a current business density cluster.

According to some embodiments of the present invention, an edge provisioning framework identifies a target edge server to act as a new edge provisioning server based on changes in the business density cluster. In that way, a new primary edge server for other edge devices in the network is established where the business density cluster is located. The edge provisioning framework handles all associations and dissociations of edge components.

Some embodiments of the present invention are directed to a process for establishing a new edge provisioning server including: (i) evaluating the edge network capacity; (ii) identifying the edge servers that are in the vicinity of the business density cluster; (iii) creating a network slice; and (iv) taking control of the other edge devices by the new edge provisioning server. In that way, and based on the business density cluster, the node-provisioning server is a new primary at the edge network and identification of build activity for the new primary may be implemented.

Some embodiments of the present invention are directed to the application of hybrid edge computing based on the concept of an invocation-based framework including: a host processor, a node spawner, a node state manager, a node replicating manager, a persistent writer and DB, a node orchestrator, and on the various components of a third party 5G provider. Some embodiments of the present invention are further directed to a solution around cloning of the binaries to the nodal edge server from the nodal edge source by providing the exact network slice requirement to the third party 5G provider.

Some embodiments of the present invention are directed to building a new primary node-provisioning server at a target edge node that involves the following process steps, not necessarily in the order presented: (i) identifying the edges; (ii) evaluating capacity and loads over multiple path availability; and (iii) migrating the replica. Edge provisioning architecture 214 (FIG. 2) provides an example architecture in which these steps may be performed.

Some embodiments of the present invention are directed to a process by which the role of primary node is transferred from a host node to an edge network and a new primary edge node is provisioned as a node-provisioning server. The process may include the following steps: (i) determining a shift has occurred in the business density within the computing environment, such as computing environment 100 (FIG. 1); (ii) identifying a new node-provisioning server in the new business density as the primary server; (iii) building the identified new primary server by: (a) estimating constraints for the new primary server; (b) based on the estimated constraints, calculating the bandwidth and time for a new network slice for spawning the new primary server; (c) allocating the new network slice; and (d) passing a YAML file to the identified new node-provisioning server to manifest identified server as the new primary server; (iv) updating the state of the binary files, which further updates the states of the affected edge nodes; (v) respawning the former primary server as a new edge node to the new primary server; and (vi) sending a response object to the host computer, the response object containing details of the final configuration of the new primary server.

Figure 2:
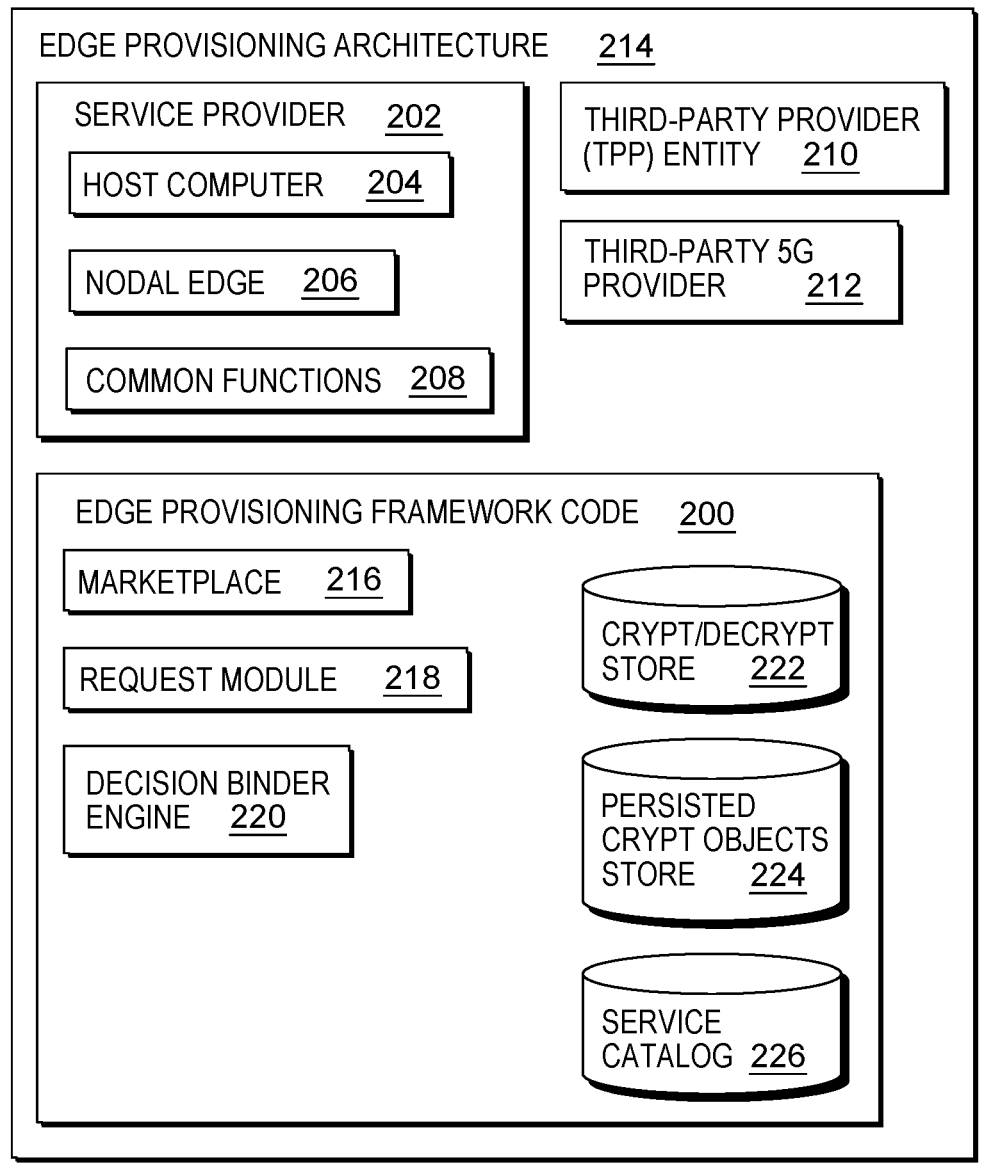
FIG. 2 is a schematic view of a first machine logic (for example, software) portion of the first embodiment system.
Figure 3:
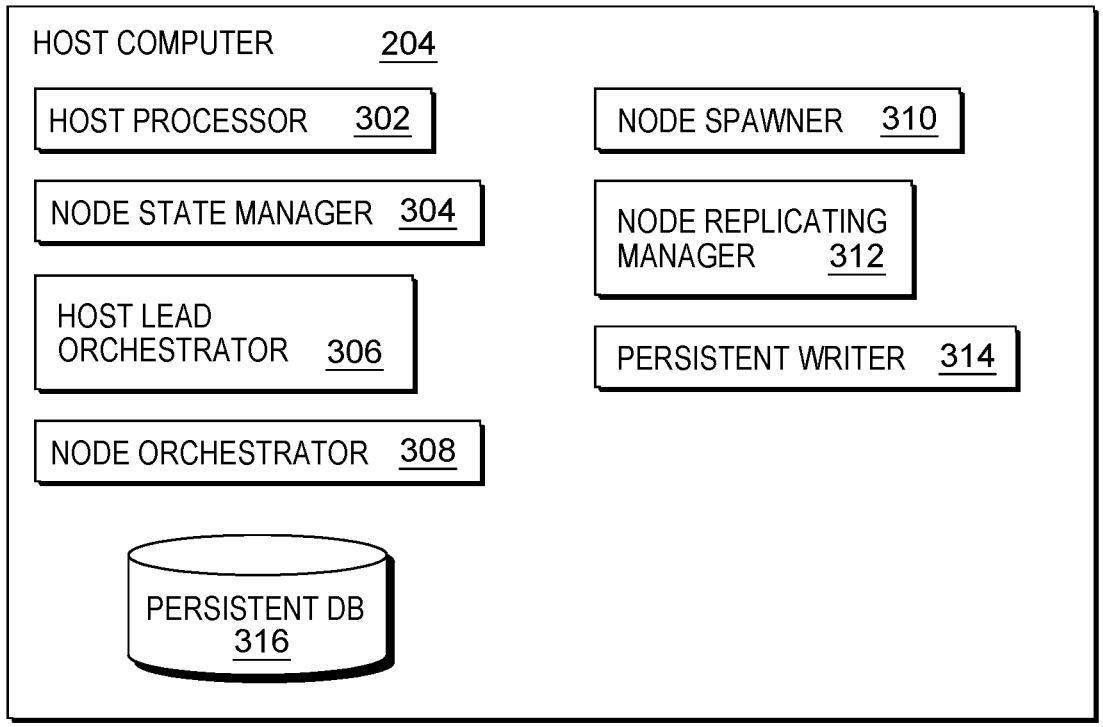
FIG. 3 is a schematic view of a second machine logic (for example, software) portion of the first embodiment system.
Figure 4:
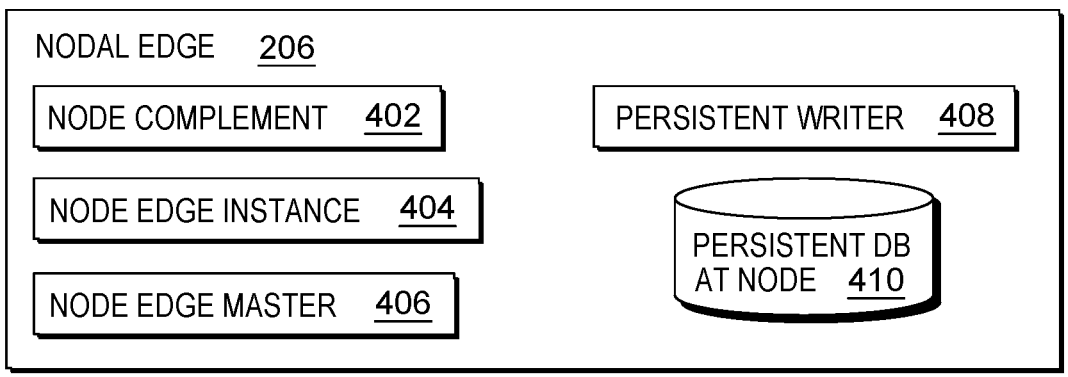
FIG. 4 is a schematic view of a third machine logic (for example, software) portion of the first embodiment system.
Figure 5:
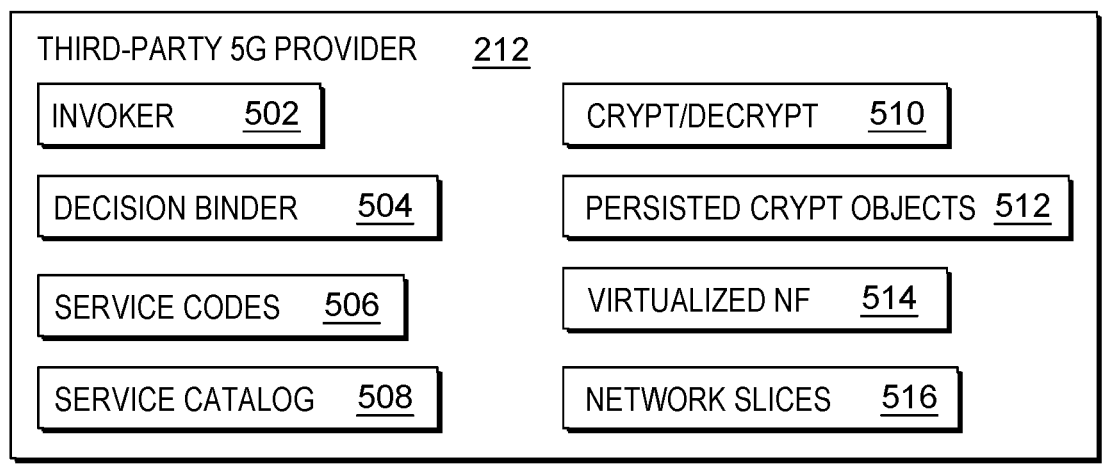
FIG. 5 is a schematic view of a fourth machine logic (for example, software) portion of the first embodiment system.

According to some embodiments of the present invention, at least portions of the above-described process for transferring the role of primary node from a host node to an edge network and for provisioning a new node-provisioning server at the edge may be performed by the edge provisioning architecture 214 of FIG. 2 with further machine logic (e.g. software) portions of the edge provisioning architecture presented in FIGS. 3-5.

Edge provisioning architecture 214 includes: edge provisioning framework code 200; service provider sub-system 202; third-party provider (TP) entity sub-system 210; and third-party fifth-generation (5G) service provider 212. The service provider sub-system includes: host computer 204; nodal edge module 206; and common functions module 208. The host computer includes (FIG. 3): host processor 302; node state manager 304; host lead orchestrator 306; node orchestrator 308; node spawner 310; node replicating manager 312; persistent writer module 314; and persistent database 316. The nodal edge module 206 includes (FIG. 4): node complement module 402; secondary node edge instance module 404; primary node edge module 406; persistent writer module 408; and persistent database at node 410. Finally, common functions module 208 includes a module that manages binaries, or binary files, such as cloning and so forth. The common functions module also includes a cluster density module that determines business density, operates to alert and/or trigger actions associated with a detected shift in the business density, and identifies a business density cluster of nodes in an edge network. The third-party 5G service provider includes (FIG. 5): invoker module 502; decision binder module 504; service codes module 506; service catalog module 508; crypt/decrypt module 510; persisted crypt objects module 512; virtualized NF module 514; and network slices module 516.

According to some embodiments of the present invention, host processor 302 is used for the identification of shift in business density within computing environment 100. Upon detection of the shift in business density, an action is triggered for nodal state manager 304 to set the node-provisioning server in the new business density cluster as the primary server. The nodal state manager, as name suggests, acts as a repository that stores and/or manages the state of binary file details of the edge servers. In this example, the nodal state manager requests nodal replicating vector module 312 to build the identified new primary server. The nodal replicating vector module estimates the constraints of the new primary server based on the requested object response from the nodal spawner module 310. The nodal spawner module receives the request from the nodal replicating vector module, which receives a request to identify the constraints for the primary node (e.g. identifying the edges and the capacity required for the primary provisioning process. Upon receipt of the various implementation details, nodal replicating vector 312 estimates the constraints for the new primary server at the edge network in the new business density. The constraints and collected implementation details are combined into a single request object and sent to the nodal spawner module 310 for establishing the new primary server, which triggers a request to nodal edge module 206. The nodal edge module solves a crypt object from crypt object store 224 to ensure validity of the request received and, upon validation, calculates the bandwidth and time for the network slice in which the new primary server will operate. A third party fifth generation (5G) service provider 212 provides the requested network slice to nodal edge module 206 upon determining that the node edge module successfully solved the crypt object. When allocation of the network slice is completed, nodal spawner module 310 passes a YAML (yet another markup language) file to the nodal edge instance module 404 to manifest a nodal edge as the nodal primary server, which is set up as the node-provisioning master server. When the nodal primary server is manifested, the nodal spawner module updates the state of the binary files managed by the nodal replicating vector module, which will further update the states of affected edge nodes and the state of former primary, which is respawned as a new edge to the nodal primary. Finally, the response object containing the final configuration details of the new primary server is sent to host processor 302.

As further illustrated in FIG. 2, edge provisioning framework code 200 includes marketplace module 216, which allows the discovery identification validation of all the requests of the participants by acting as a distributed ledger-based framework. Request module 218 is a request handler that ensures that there are no byzantine or compromised requests processed. Crypt/Decrypt store 222 is the repository of the crypt and the decrypt objects which are discoverable on the distributed ledger. The crypt/decrypt store ensures that replicas and voting nodes form a consensus to identify a valid service request. Persisted crypt objects store 224 is an archived and available repository of the crypted objects received from participants. Decision binder engine 220 operates as a state engine for the requests and their affiliated transactions and decisions that are bound through crypt objects. Service catalog 226 is accessible by active participants along with their geospatial compatibility.

The crypt object is used by a service provider to invoke a service on the distributed ledger platform. The service request is invoked on marketplace module 216 by solving a crypt that the marketplace provides to the service provider. After solving the crypt, the crypt object is passed to the marketplace so that marketplace can ensure that the service is authorized according to the counterparty. Thus, it takes the request that it has received from the service provider as a crypt object. It passes the script object to the counterparty, who also has to solve decrypt before validating the transaction. The reason to solve the crypt for every interaction in the marketplace is to ensure that there is authenticity in the transaction in the marketplace. In this example, 5G service provider 212 solves the crypt object to ensure that the transaction is authorized. It is validated by establishing its identity through solving a crypt or consuming some of the compute resources, thus ensuring and establishing that the parties are interested in validating this transaction. The nodal edge module 206 passes the crypt object along with its configuration to the nodal spawner 310 at the host computer 204. This is done because the host and the nodal edge both recognize the crypt and it secures the communication from the edge to the host bi directionally. Further, the script objects are stored at the host ensuring that by encrypting the request and/or configurations once no subsequent actions are required to enhance the security.

Some embodiments of the present invention are directed toward identifying a change in business density to trigger a build activity for a new edge node-provisioning server, which is achieved by transformation of and edge node to an edge provisioning server. The transformation is performed while ensuring that the required constraints are met, such as the required node or network capacity and association of the edge nodes to the new node-provisioning server.

Some embodiments of the present invention evaluate capacity when establishing a new primary server. Loads are on the edge nodes that are traversed on the graph paths. The edge node with the least capacity bounds the capacity of the path. The available "path capacity" at time t then guides the capacity constraint as follows:

$$\{v_{i,k,t} = \mathrm{argmin}(B_e - l_{e,t}) * g_{i,k,e}\} \forall 1 \le i,k,t \ne k \le |S|, 1 \le t \le T, 1 \le e \le E$$

where:
S is the set of servers across all data centers, where $S = \{s_1, s_2, \ldots, s_i, \ldots, s_k, \ldots, s_{|S|}\}$;
$B_e$ is the bandwidth capacity $\forall e \in E$;

E is the set of edges connecting servers in S. The links of the backbones are represented by a set of edges E;

G is a matrix |S|×|S|×|E| representing edges used in a path, where:

$$g_{i,k,e} = \begin{cases} 1 & \text{if edge } e \text{ is used in shortest path} \\ 0, & \text{otherwise} \end{cases};$$

and

T is the worst-case migration time.

When evaluating loads where there is multiple path availability, some embodiments of the present invention operate according to a calculated load, not to exceed the edge node capacity. As noted, the edge nodes may be traversed by multiple paths, that is, multiple paths between different source destination pairs can share common edges. Therefore, the load on an edge, not exceeding edge capacity, may be written as follows:

$$l_{e,t} = \left\{ \sum_{i=1}^{|S|} \sum_{j=1}^{|P|} \sum_{k=1}^{|S|} g_{i,k,e}, r_{i,j,k,t} \right\}_{\forall 1 \leq i,k, i \neq k \leq |S|, 1 \leq t \leq T, 1 \leq e \leq E}$$

where:

R is the matrix |S|×|P|×|S|×T, where $$r_{i,j,k,t} = \begin{cases} 1 & s_i \text{ is migrating replica of } p_j \text{ to } s_k \text{ at time } t \\ 0, & \text{otherwise} \end{cases}.$$

Identifying the edge nodes ensures that former primary node-provisioning server edges are associated to the new primary node-provisioning server. Performance of configuration updates may need to be completed to ensure that each edge node is associated with a primary server. The process of evaluating capacity and loads over multiple path availability is performed before transformation of the target edge node to the new primary node-provisioning server. Edge loads are traversed through the graphical path. The capacity of the least-capacity edge nodes bounds the capacity of the path. Some embodiments of the present invention further ensure the load does not exceed the capacity when edge nodes are traversed along multiple paths, recognizing that many edge nodes are common along different source-to-destination paths. Regarding replica migration, the edge provisioning framework initiates the replica of the partition. The term "partition" as used herein refers to the vertical slice of the requisite layers depicted, for example, in the reference architecture of FIG. 2 migrating from servers (i.e. from one old primary node-provisioning server to another new primary node-provisioning server).

Some embodiments of the present invention are directed to replication based on sequential availability of geo-spatially available hybrid edge resources. Initiating migration by associating the replica of partition migration indicator variable $x_{i,j,k,t}$ with need for migration of replica of partition pj from $s_i$ to $s_k$, in variable $y_{i,j,k}$ may be written as follows:

$$\left\{ \sum_{t=1}^{T} x_{i,j,k,t} \leq \beta * y_{i,j,k} \right\}_{\forall 1 \leq i,k, i \neq k \leq |S|, 1 \leq j \leq |P|} \quad (1)$$

$$\left\{ \sum_{t=1}^{T} x_{i,j,k,t} \leq y_{i,j,k} \right\}_{\forall 1 \leq i,k, i \neq k \leq |S|, 1 \leq j \leq |P|} \quad (2)$$

-continued $$\left\{ \sum_{k=1}^{|S|} x_{i,j,k,t} \leq z_{i,j,t} \right\}_{\forall 1 \leq i, \leq |S|, 1 \leq j \leq |P|, 1 \leq t \leq T} \quad (3)$$

where:

β is a scalar latency constant;

X is the matrix |S|×|P|×|S|×T representing migration sequence, where $$x_{i,j,k,t} = \begin{cases} 1 & s_i \text{ is migrating replica of } p_j \text{ to } s_k \text{ at time } t \\ 0, & \text{otherwise} \end{cases};$$

and

Y is the matrix |S|×|P|×|S| representing a need for partition migration, where $$y_{i,j,k} = \begin{cases} 1 & s_i \text{ is provider of replica of } p_j \text{ to } s_k \\ 0, & \text{otherwise} \end{cases}.$$

Some embodiments of the present invention are directed toward a process including: (i) identifying the business density shift and adequately respond by creating or spawning new master and configured hybrid edge nodes near the new business density geo spatiality; (ii) allowing the validation of service requests and provisioning of host edge transactions such as pass the control from a previously known host to a newly spawned master based on geo spatiality; (iii) identifying right replication technology specification and configuration required to span for multiple pathways based on the edge or sequential availability of geo-spatially available hybrid edge resources; (iv) detecting the shift in the business density based on the predefined business rules to define and activate a new node-provisioning server in revised geo-spatial density as the master; (v) providing an ability to ensures that all constraints are satisfied in the specification of the new master including identifying the edges, deriving the capacity required for the master provisioning by taking into consideration bandwidth available, previous migration time and workload size; and (vi) posting a migration activity, an ability that ensures that the old master will be respawned as new edge and all the edges association with old master will be reconfigured to new master node-provisioning server spawned.

Figure 6:
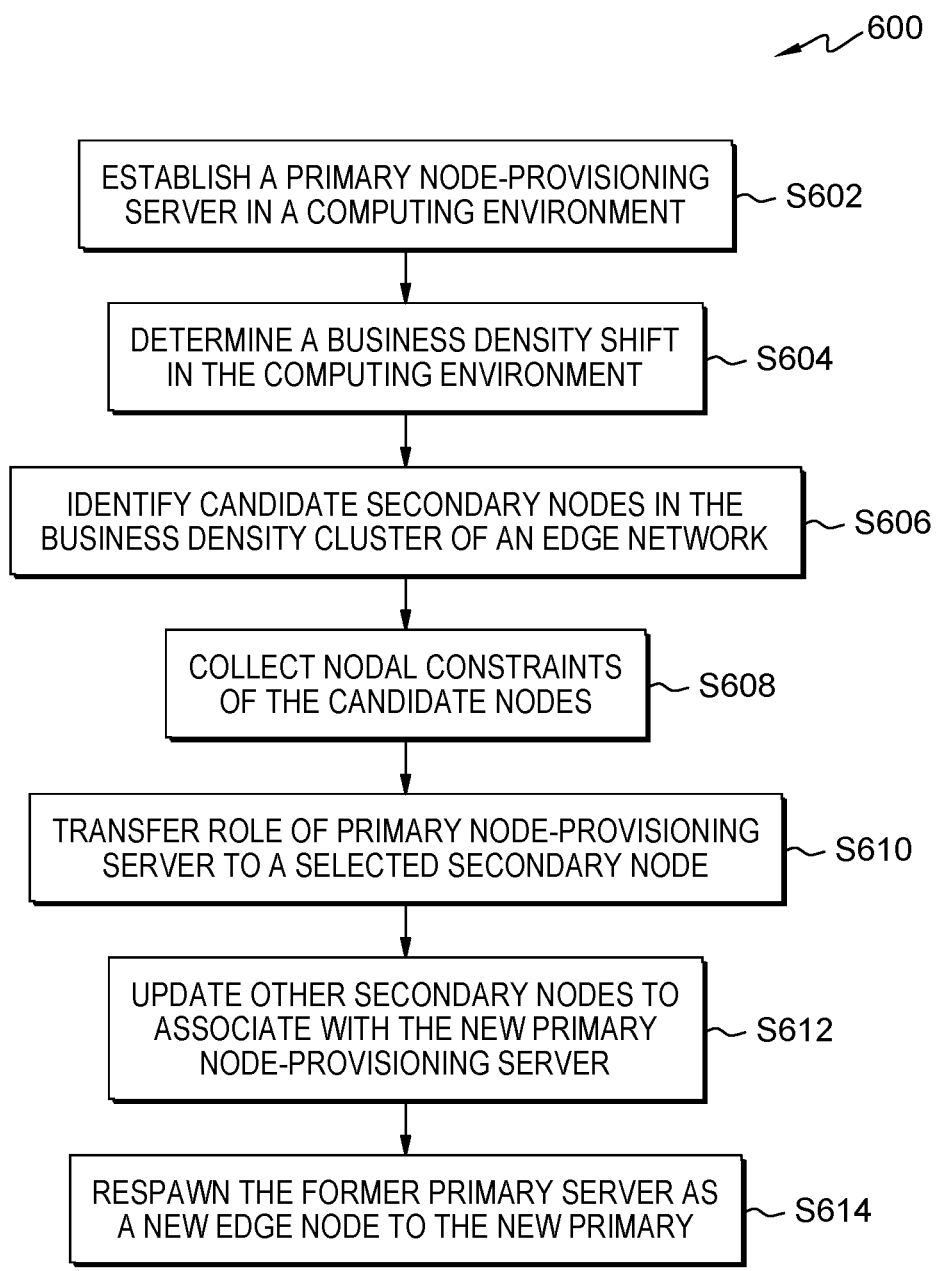
FIG. 6 is a flowchart showing a first method performed, at least in part, by the first embodiment system.

FIG. 6 shows flowchart 600 depicting a method according to the present invention. FIGS. 2 through 5 show machine logic (for example, software) portions for performing at least some of the method steps of flowchart 600. This method and associated software will now be discussed, over the course of the following paragraphs, with extensive reference to FIG. 6 (for the method step blocks) and FIGS. 3 and 4 (for the software blocks).

Processing begins at step S602, where nodal edge module 206 establishes a primary node-provisioning server in a computing environment. In this example, a primary node-provisioning server in established in an edge network of a computing environment and the primary node-provisioning server is the primary, or master, server. The geo-spatial relevance of the location of the primary node-provisioning server to the location of the business density has not necessarily been addressed. Alternatively, the initial establishment of the primary node-provisioning server is based on a current business density cluster in which the primary node-provisioning server is located.

Processing proceeds to step S604, where host processor 302 determines a business density shift in the computing environment. In this example, the host processor determines a business density shift via a cluster density module in common functions module 208 (FIG. 2). In this example, the geo-spatial business density is it identified and monitored for a shift in the make up of the cluster of edge nodes in which the business density is located. The cluster density module (not shown) detects the business density shift in the computing environment. Alternatively, the business density is established in step S602 when the primary node-provisioning server is set up and the detecting of a business density shift also indicates, by definition of a "shift," that the current primary node-provisioning server is no longer geo-spatially proximate to or within a pre-defined boundary of the business density cluster. That is, determining a shift in business density may be pre-defined such that a condition based on certain business rules is met in order to trigger actions related to a business density shift.

Essentially a business density shift drives certain services, such as monitoring services, in the computing environment. In that way, needed resources are available in the location where the resources are used. Assigning a primary node at the edge where the business density is located achieves this objective. For example, a user involved with the seasonal fruit industry may need monitoring services at the demand side of the supply chain, when the harvest of the fruit is procured from the farm and shipped to the processing center. Business density will shift when the processing center is distributing processed fruit. According to some embodiments of the present invention, the business density shift is determined when a threshold amount of fruit is being distributed. Alternatively, when the ratio of fruit procured by the farm to the fruit distributed by the center meets a threshold shift toward distribution, the business density shift will be triggered. Monitoring services may then shift to the distribution side of the supply chain when the processing center ships to the marketplace. A threshold value for a business density shift may be, for example, when the percentage of ingestion of the harvest is adequate to start processing a the processing center.

Processing proceeds to step S606, where node state manager 304 identifies candidate secondary nodes in the business density cluster of an edge network. The identified business density cluster includes various secondary edge nodes associated with a primary edge node. The node state manager identifies candidate secondary nodes that may be set as the primary node-provisioning server when the business density shifts aware from the current primary node-provisioning server. The nodal state manager is ascribed the functionality to identify which of the hybrid edge nodes are in the state possible to be considered for becoming the master, or primary. It takes into account the geo-spatial location of that candidate from the other edge nodes that need replication. The replication technique technology is standard in a way that only the configurations that are required to create the edge node or the primary are passed through as binaries that the hybrid edge node can execute to activate and carry out the described business functionality.

Processing proceeds to step S608, where node replicating manager 312 collects nodal constraints of the candidate nodes. In this example, nodal constraints include available bandwidth, identity of edge nodes, capacity required for the primary provisioning activity, previous migration time, previous workload size.

Processing proceeds to step S610, where host processor 302 transfers the role of primary node-provisioning server to a selected secondary node. The process of transferring the role of primary node-provisioning server involves interactions within the computing environment 100 including communications with third-party fifth-generation service provider 212 and operations performed by edge provisioning framework code 200. Example implementation processes are described in more detail within this Detailed Description.

For example, a selected secondary node is set as the primary node provisioning server, which is build according to collected nodal constraints based on the edge network and other computing environment data. The crypt object is used by a service provider to invoke a service on the distributed ledger platform that is being called the nimble. The service request is invoked on the marketplace bye solving a crypt that the marketplace—nimble—provides to the service provider. After solving the crypt, it is passed to the marketplace so that marketplace can play the novation and ensure that the service is commissioned, met with its counterparty. Thus, it takes the request that it has received from the service provider as a crypt object. It passes the script object to the counterparty who also has to solve decrypt before validating the transaction. The reason to solve the crypt for every interaction in the marketplace is to ensure that there is authenticity in the transaction, and it is not a span or a non-confirmatory party counterfeiting the services in the marketplace.

Processing proceeds to step S612, where node edge instance module 404 updates other secondary nodes to associate with the new primary node-provisioning server. Upon completing the transfer of primary roles, the configurations of the secondary nodes are updated to the new primary node-provisioning server.

Processing ends at step S614, where node spawner module 310 respawns the former primary server as a new edge node to the new primary server. Finally, the former primary server is addressed in this process flow. As noted elsewhere, the steps herein may be performed in certain alternate orders including being performed in parallel with various other steps. The former primary server is respawned as a new edge node in the edge network including the new primary server.

Figure 7:
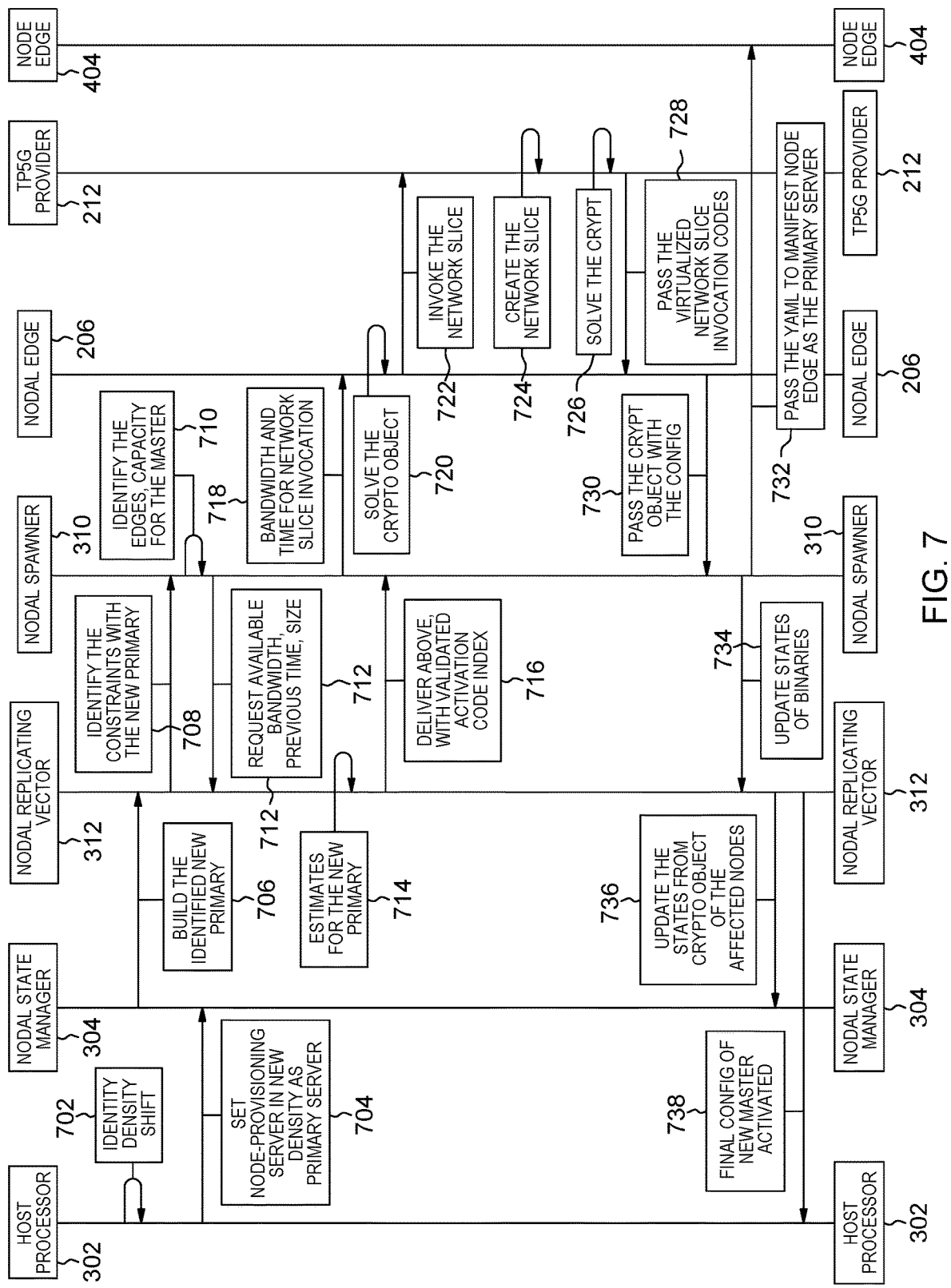
FIG. 7 is a swim diagram showing a second method performed, at least in part, by the first embodiment system.

The transfer of the role of primary node from a host computer to the edge network and provision a new primary node as a node-provisioning server involves various sequential steps as shown in FIG. 7. Some embodiments of the present invention are directed to a process for establishing an edge node-provisioning master server responsive to identification of a business density shift in which a current master server is remote relative to edge nodes in the new business density. The process illustrated in FIG. 7 includes: host processor 302 identifies the business density shift (702); host processor 302 sets the node-provisioning server in the new density as the master (704); nodal state manager 304 builds the identified new master (706); nodal replicating vector (312) identifies the constraints with the master (708); nodal spawner 310 identifies the edges and capacity required for the master provisioning server (710); nodal spawner 310 submits request for available bandwidth, previous migration time, and workload size (712); nodal replicating vector 312 generates estimates for the new master as a subroutine (714); nodal replicating vector 312 performs the above actions with validated activation code index generated to create and identify a new primary (716); nodal spawner 310 transmits bandwidth and migration time for network slice invocation to nodal edge (718); nodal edge 206 solves the crypto object for edge provisioning framework (720); nodal edge 206 invokes the network slice by passing the crypto object to the third-party 5G provider (722); third-party 5G provider 212 creates the requisite network slice (724); third-party 5G provider 212 solves the crypto object (726); third-party 5G provider 212 passes the virtualized network slice invocation codes to the nodal edge (728); nodal edge 206 passes the crypt-object along with its configuration to the nodal spawner (730); nodal spawner 310 passes the YAML to manifest nodal edge as nodal master to nodal edge instance 404 (732); the "old master" is respawned as a new edge to the new master; nodal spawner 310 updates the state of binary files to reflect new configuration (734); nodal replicating vector 312 updates on the states (from crypto object) of all affected nodes (736); and nodal replicating vector 312 reports to host processor 302 that final configuration of new master is activated (738).

Some embodiments of the present invention are directed to a mechanism where edge devices on one network talk to edge devices on another network resulting in symbiosis of the two networks at the edge of the network rather than at the server.

Some embodiments of the present invention are directed to a hybrid edge provisioning process where one edge network creates the customer journey for another edge network. In some embodiments, the hybrid edge provisioning process is facilitated by an edge provisioning framework for migration, or transformation, of one edge provisioning server to a new edge provisioning server.

Some embodiments of the present invention are directed to more than just scheduling a request of hybrid edge computing by obtaining circumstances of a topological structure, computing resources and communication resources of a communication network and determining the number of hybrid edge servers placed in the communication network, wherein the hybrid edge server is a server providing services by using public resources and private resources.

Some embodiments of the present invention are directed to more than a method for provisioning resources in an edge computing environment based on business parameters (such as available site facilities, supported applications and their requirements, measured or estimated user load, etc.).

Some embodiments of the present invention are directed to more than a method for optimizing service provisioning in an edge federation by configuring an edge service provider (ESP) to contract services from an end device and configuring an edge infrastructure provider (EIP) to provide edge computing resources to the contracted services from the ESP, wherein the edge federation brings the customized resources for the ESP and end user in a broad, fast, and reliable geo-distributed manner.

According to some embodiments of the present invention, agile provisioning ensures the spawning of adequate resources when faced with a validated business density shift. Depending on the business density shift, which is identified by host-processor (based on the predefined rules), the edge provisioning framework upgrades existing identified edge nodes to the node-provisioning server.

Some embodiments of the present invention are directed to identification of the business density shift which will activate a node-provisioning server in a revised geo-spatial density as the new master node.

According to some embodiments of the present invention, the identification of a business density shift triggers provisioning of a new master and configuration of hybrid edge nodes near the new business density geo spatiality and may perform these activities on another network as well as on two edges of the other network.

Some embodiments of the present invention are directed to a mechanism where an edge device on another network talks to an edge device on some other network (i.e., symbiosis of the two networks not at the server end but on the edge of the server which changes the complete gamut of the hybrid edge service provision). Based on the business function requirement of ultra-low latency, the edge cloud function spawning location may vary which will changes the business density cluster. Based on the business density cluster changes, framework will identify the edge server that will now act as new edge provisioning server (i.e., a new master for other edges). The framework will handle all associations and dissociations of edge. The disclosure will evaluate the edge capacity, edges that are in vicinity, it will create a network slice and take a control of the other edges. Based on the identified business density shift, the node-provisioning server is established as the new primary server, leading to identification of a build activity for the new primary.

Some embodiments of the present invention may include one, or more, of the following features, characteristics and/or advantages: (i) creates a hybrid experience at the edge device level using an edge provisioning framework that supports agile use of available edge network nodes; (ii) runtime requests of an identified channel point to a network slice may be made with respect to a given bandwidth and a given time period; (iii) runtime identification and cloning of certain binary files that are geospatially closer than others to the edge provisioning primary; (iv) provisioning request for an optimized and derived narrow-band network slice in real time to effectively clone binary files; (v) methods that allow for validation of service requests and provisioning of host edge transactions to pass the control from a previously known host to a newly spawned primary edge node based on geospatial filter; (vi) leverages the full potential of edge computing; and/or (vii) introduces a framework for hybrid edge provisioning that is agile to the extent of ensuring to spawn adequate edge resources for a validated business density shift.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v)

located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    determining a business density shift to an identified business density cluster;
    responsive to determining the business density shift, determining a set of candidate secondary nodes located within a geo-spatial boundary of the identified business density cluster in an edge network;
    collecting nodal constraints for a primary node-provisioning server in the geo-spatial boundary; and
    transferring a role of primary node-provisioning server to a selected secondary node of the set of candidate secondary nodes to establish a new primary node-provisioning server.

2. The computer-implemented method of claim 1, further comprising:
    determining a first primary node-provisioning server is outside the geo-spatial boundary of the identified business density cluster; and
    respawning the first primary node-provisioning server as a new secondary node to the new primary node-provisioning server.

3. The computer-implemented method of claim 1, further comprising:
    updating a set of remaining secondary nodes to associated with the new primary node-provisioning server.

4. The computer-implemented method of claim 1, further comprising:
    updating a state of binary files to reflect a new configuration including the new primary node-provisioning server.

5. The computer-implemented method of claim 1, further comprising:
    analyzing the nodal constraints including a validated activation code index;
    transmitting bandwidth and migration time for invocation of a network slice; and
    solving a corresponding crypto object to invoke the network slice.

6. The computer-implemented method of claim 5, further comprising:
    receiving, from a third-party fifth-generation (5G) provider, virtualized network slice invocation codes for manifesting the new primary node-provisioning server.

7. A computer program product comprising a computer-readable storage medium having a set of instructions stored therein which, when executed by a processor, causes the processor to perform a method comprising:
    determining a business density shift to an identified business density cluster;
    responsive to determining the business density shift, determining a set of candidate secondary nodes located within a geo-spatial boundary of the identified business density cluster in an edge network;
    collecting nodal constraints for a primary node-provisioning server in the geo-spatial boundary; and
    transferring a role of primary node-provisioning server to a selected secondary node of the set of candidate secondary nodes to establish a new primary node-provisioning server.

8. The computer program product of claim 7, further causing the processor to perform a method comprising:
    determining a first primary node-provisioning server is outside the geo-spatial boundary of the identified business density cluster; and
    respawning the first primary node-provisioning server as a new secondary node to the new primary node-provisioning server.

9. The computer program product of claim 7, further causing the processor to perform a method comprising:
    updating a set of remaining secondary nodes to associated with the new primary node-provisioning server.

10. The computer program product of claim 7, further causing the processor to perform a method comprising:
    updating a state of binary files to reflect a new configuration including the new primary node-provisioning server.

11. The computer program product of claim 7, further causing the processor to perform a method comprising:
    analyzing the nodal constraints including a validated activation code index;
    transmitting bandwidth and migration time for invocation of a network slice; and
    solving a corresponding crypto object to invoke the network slice.

12. The computer program product of claim 11, further causing the processor to perform a method comprising:
    receiving, from a third-party fifth-generation (5G) provider, virtualized network slice invocation codes for manifesting the new primary node-provisioning server.

13. A computer system comprising:
    a processor set; and
    a computer readable storage medium;
    wherein:
    the processor set is structured, located, connected, and/or programmed to run program instructions stored on the computer readable storage medium; and
    the program instructions which, when executed by the processor set, cause the processor set to perform a method comprising:
        determining a business density shift to an identified business density cluster;
        responsive to determining the business density shift, determining a set of candidate secondary nodes located within a geo-spatial boundary of the identified business density cluster in an edge network;
        collecting nodal constraints for a primary node-provisioning server in the geo-spatial boundary; and
        transferring a role of primary node-provisioning server to a selected secondary node of the set of candidate secondary nodes to establish a new primary node-provisioning server.

14. The computer system of claim 13, further causing the processor to perform a method comprising:
    determining a first primary node-provisioning server is outside the geo-spatial boundary of the identified business density cluster; and
    respawning the first primary node-provisioning server as a new secondary node to the new primary node-provisioning server.

15. The computer system of claim 13, further causing the processor to perform a method comprising:

updating a set of remaining secondary nodes to associated with the new primary node-provisioning server.

16. The computer system of claim 13, further causing the processor to perform a method comprising:
updating a state of binary files to reflect a new configuration including the new primary node-provisioning server.

17. The computer system of claim 13, further causing the processor to perform a method comprising:
analyzing the nodal constraints including a validated activation code index;
transmitting bandwidth and migration time for invocation of a network slice; and
solving a corresponding crypto object to invoke the network slice.

18. The computer system of claim 17, further causing the processor to perform a method comprising:
receiving, from a third-party fifth-generation (5G) provider, virtualized network slice invocation codes for manifesting the new primary node-provisioning server.

* * * * *